United States Patent [19]

Simonetti

[11] Patent Number: 4,578,213

[45] Date of Patent: Mar. 25, 1986

[54] HIGH TEMPERATURE PLASTIC SCINTILLATOR

[75] Inventor: John J. Simonetti, Cranbury, N.J.

[73] Assignee: Sangamo Weston, Inc., Norcross, Ga.

[21] Appl. No.: 604,699

[22] Filed: Apr. 27, 1984

[51] Int. Cl.$^4$ ............................................. C09K 11/06
[52] U.S. Cl. ............................ 252/301.17; 250/361 R
[58] Field of Search ...................................... 252/301.17

[56] References Cited

U.S. PATENT DOCUMENTS

| | | | |
|---|---|---|---|
| 2,745,967 | 5/1956 | Ludeman | 252/301.17 |
| 3,010,908 | 11/1961 | Broderick et al. | 252/301.17 |
| 3,011,978 | 12/1961 | Gosnell et al. | 252/301.3 |
| 3,068,178 | 12/1962 | Kallmann | 252/301.17 |
| 3,567,925 | 3/1971 | Muga et al. | 250/71.5 |
| 3,600,445 | 8/1971 | Wirth et al. | 252/301.17 |
| 3,791,983 | 2/1974 | Maierson | 252/305 |
| 3,886,082 | 5/1975 | Hyman, Jr. | 252/301.2 R |
| 3,950,646 | 4/1976 | Whitlock | 250/361 |
| 4,180,479 | 12/1979 | Siegrist et al. | 252/301.24 |

OTHER PUBLICATIONS

Mitchell et al., J. Chem. Phys. 67(11), 1977, pp. 4832–4835.
Birks Scintillation Counters McGraw-Hill Book Co., N.Y., N.Y.; 1953, pp. 102–105.

*Primary Examiner*—Arthur P. Demers
*Attorney, Agent, or Firm*—Dale Gaudier

[57] ABSTRACT

A plastic scintillator comprises a polymethylpentene thermoplastic material containing a fluorescent additive. This plastic scintillator material functions at high temperatures with excellent optical properties in the detection of neutrons.

4 Claims, No Drawings

HIGH TEMPERATURE PLASTIC SCINTILLATOR

FIELD OF THE INVENTION

This invention relates to a new plastic scintillator, and more particularly to a novel plastic scintillator which will function at temperatures to 200° C. and higher with exceptional optical properties.

BACKGROUND OF THE INVENTION

Scintillation materials are used in the detection and measurement of radiation. Scintillators are composed of substances which are capable of absorbing energy given off by the fission fragments emitted by radioactive elements. The absorbed energy excites fluorescent materials contained in the scintillator, so that the fluorescent materials give off light. Such scintillators are useful in many different applications, e.g., the detedtion of radioactive mineral deposits, and the detection and measurement of radioactive contamination.

Plastics are often used as such scintillation materials. The plastic materials that have found the widest application consist of those manufactured from thermosetting plastics. These thermosetting plastics include polystyrene, polyvinyl toluene, and various acrylic polymers. The acrylic polymers are primarily employed for their cost effectiveness in fabrication of large volume scintillators.

The generation of light from these plastics is accomplished through the addition of small amounts of many different combinations of organic molecules known to have fluorescent properties of high efficiency. These molecules include p-terphenyl and naphthalene.

Hyman, Jr. U.S. Pat. No. 3,886,082, issued May 27, 1975, discloses an example of one such plastic scintillator material. The scintillator disclosed in Hyman employs acrylic polymers and copolymers as the host plastic and bis-(o-methyl styryl)benzene, perylene, tetraphenylbutadiene, diphenylanthracene, bis(phenyloxazolyl benzene), and dimethyl bis(phenyloxazolyl benzene) as the fluorescent additive.

Siegrist et al., U.S. Pat. No. 4,180,479, issued Dec. 25, 1979, discloses the use of various stilbene derivatives as fluorescent agents in scintillators.

The prior art scintillators have the disadvantage that none of the host polymers have been found suitable for use at temperatures up to and above 200° C. For example, the maximum temperature of non-cross linked polyvinyl toluene is 75° C.; and that of cross-linked polyvinyltoluene is 100° C. The prior art polymers with the highest temperature resistance are the acrylic copolymers, with a maximum temperature of 150° C.

SUMMARY OF THE INVENTION

It is therefore an object of this invention to provide a new scintillator host plastic material which will function at high temperatures with exceptional optical properties.

It is further an object of this invention to provide a scintillator composition comprising a host plastic containing a primary fluorescent additive, and, optionally, containing a secondary fluorescent dye.

Still further objects of this invention are to provide a method of producing these said scintillator compositions and their use in the detection and measurement of radioactive sources.

This invention relates to the use of polymethylpentene as a scintillator host plastic material, to provide plastic scintillators which will function at high temperatures. Primary, and optionally, secondary fluorescent agents, are added to the host plastic.

This invention also relates to a method of producing the plastic scintillator composition, which comprises melting the polymethylpentene in an evacuated chamber, adding and mixing the fluorescent agents while the composition is maintained at a temperature above the melting point, and cooling the composition.

Description of the Preferred Embodiments

As indicated above, this invention relates to scintillators and methods of detecting radiation with the scintillators, either from mineral deposits or in the measurement of radioactive contamination. According to the present invention, it has been found that a modified polymethylpentene finds particular advantage as a plastic scintillator because the material has excellent hightemperature resistance and good optical properties. In particular, it has been found that the modified polymethylpentene has the capacity to withstand operations at temperatures as high as 200° C. and higher without visible distortion. In addition, this modified plastic material is very transparent in the ultraviolet range and maintains greater than 60 percent transmission for 0.5 cm samples at 400 nm.

Polymethylpentene is a known thermoplastic material and is available commercially. For example, polymethylpentene in the form of pellets is available from the Mitsui Chemical Company of Japan. The polymethylpentene provides special advantages in use as a scintillating plastic material. Its unique properties permit its use at higher temperatures in the detection of neutron radiation fluxes than known previously in the prior art, the polymethylpentene thermoplastic having a melting point of 235° C.

For use in the present invention, the polymethylpentene is modified in order to provide the special advantages of the present invention. According to the method of the present invention, the polymethylpentene resin pellets are initially melted and then cast into shape by a refreezing process. During the melting operation, however, or while the thermoplastic material is in melted form, there is added thereto small amounts of different combinations of organic materials which have fluorescent properties of high efficiency. This is necessary since the polymer per se does not possess these characteristics. Thus fluorescent organic compounds are added to the melt in order to convert the incoming radiation to light which can be detected by a photomultiplier tube when used as a scintillator.

In an initial step of the method of the invention, the resin pellets of the polymethylpentene are subjected to an elevated temperature to melt the pellets and form a plastic melt. Suitable apparatus, such as the use of a glass manifold and a mechanical vacuum pump, can be used for this operation as described in the examples set forth below. It is preferred that the temperature of the polymethylpentene pellets be raised to the range of 250° C. to 350° C. and maintained at this temperature to provide time for addition of the fluorescent agents and other additives as necessary. The melting operation is carried out at a temperature high enough to purify the thermoplastic by evolving or driving off materials such as antioxidants which have been added to stabilize the plastic material.

After the melt is obtained in accordance with the above procedure, it is then in condition for addition of fluorescent dyes as necessary. Preferably, the fluorescent dyes are added while the melt is maintained at temperatures in the range of about 250° C. to 320° C. with the melt temperature being determined by the physical properties of the compound to be added to the melt. In one aspect of the invention, one or more aromatic compounds are added as a primary fluorescent agent to convert the polymethylpentene into a material which will transfer energy and cause the polymethylpentene to have the capacity to emit light. Aromatic compounds which meet this criteria include about 1 to 10 weight percent of a material such as naphthalene or a derivative thereof such as methyl- or dimethyl naphthalene, ethyl naphthalene, propyl naphthalene, or fluorine substituted naphthalene. Of course, other naphthalene derivatives well-known to those skilled in the art could be used.

Optionally, a secondary fluorescent dye may also be added. The secondary dyes include anthracene or anthracene derivatives, oxazole or oxazole derivatives, oxadiazole, or styryl or stilbene derivatives. The secondary dyes are employed to gain maximum emission near 420nm. When the primary and secondary fluorescent compounds are added, suitable mixing should be achieved in order to assure a homogeneous distribution of the components. It has been found experimentally that anthracene present in concentrations of about 0.1 weight percent gives the best results.

After the completion of the fluorescent additives, the melt is then cooled, preferably by a slow cooling procedure, to lower the temperature to below 200° C., where the scintillator hardens into the desired shape.

The resulting plastic scintillator will be found to have undergone both optical and nuclear spectroscopic changes. Thus, the plastic scintillator now possesses the necessary properties to withstand unsupported operation to 200° C. and higher with no visible distortion. An optical spectroscopic study of this polymethylpentene material as a function of temperature shows no deterioration in fluorescent light output when cycled consecutively through 75° C., 150° C., and 200° C. for 1 hour each, after which the material is returned to room temperature. Further, ultraviolet excited fluorescent spectroscopy at temperature indicates that, unlike conventional plastic scintillator systems, the formulation actually increases in overall light output. The measured increase is a function of the exact composition but has been as large as a factor of 2 at 200° C., compared to total light output at room temperature. The most striking advantages of the scintillator of the present invention are the high temperature resistance, low density and the high hydrogen concentration, as compared to the best obtainable commercial plastic scintillators. A high hydrogen content is essential for scintillators to be used in neutron detection.

The present invention is illustrated in the following examples, where parts are by weight unless otherwise indicated. However, the invention is not to be considered as limited thereto.

EXAMPLE I

The polymethylpentene scintillator composition is made and cast to shape by a simple melting and refreezing process. In this procedure, a glass manifold and oil sealed mechanical vacuum pump, and an external source of heat are used. The glass manifold consists of a nitrogen inlet vacuum valve, an outlet valve, and a liquid nitrogen cooled vacuum trap between the sample vial attachment port and the oil filled vacuum pump. A simple mechanical vacuum gauge is fitted between the vacuum pump and galss manifold pump-out port to monitor vacuum conditions. The resin vial consist of an 8" long, 32 mm diameter pyrex tube with a flat bottom. This vial is necked into a ½" pyrex tube. Before this vial is used, it is scrubbed thoroughly with detergent and rinsed with deionized water. The vial is then dried by washing with reagent grade propanol and heating in an oven. The dried vial is then Silanized with a xylene solution of 5% dichlorosilane. The 8" long section of vial is filled with polymethylpentene resin pellets to a height of 12.5 cm. The resin pellets used were the RT 18 forumulation of TPX, obtained from the Mitsui Chemical Company of Japan.

A vacuum of greater than 28" of mercury is established in the cleaned glass manifold after the resin vial has been filled and sealed onto its evacuation port. The temperature of the vial and resin is then raised to 300° C. and maintained at this temperature for three hours. The vial transition tube is also heated to 300° C. This allows any lower boiling antioxidant addition to the resin to be removed. The antioxidant material condenses on the cooler part of the glass manifold, away from the resin vial. The vacuum melting of the polymethylpentene is accompanied by considerable bubbling of the liquid resin. Incomplete outgassing will result in a frozen melt of cloudy appearance. After three hours of vacuum melting, the glass manifold is backfilled with boil-off nitrogen gas. As exhaust port is then opened and the nitrogen gas is allowed to flow through the manifold during the mixing and freezing process. This procedure produces a purified polymethylpentene melt.

EXAMPLE II

The polymethylpentene melt produced by the process disclosed in Example I is maintained at a temperature of 250° C. to 320° C. for the addition of various fluorescent compounds. The melt temperature is determined by the physical properties of these compounds. At this point 1-10 wt % of naphthalene, and preferably 1.5 wt % of naphthalene, is added slowly to the melt, followed by approximately 0.01 wt % of anthracene as a wavelength shifter. Addition of all solutes is accomplished through an introduction port directly above the vial containing the polymethylpentene melt. The flowing nitrogen prevents the influx of air from the port, while the fluorescent compounds are being added. Immediately after addition of the fluorescent compounds, the melt is mixed with a stainless steel rod for fifteen minutes. This assures a homogeneous distribution of components.

Mixing is followed by a relatively rapid cooling cycle to freeze the melt. Although rapid, uncontrolled freezing can produce scintillator material, it shoudl be noted that a much slower or directionally controlled freezing yields material of higher homogeneity. Such controlled freezing is accomplished by the use of a programmable, ramped temperature lowering system. The directional freezing is accomplished by slow lowering of the melt out of the oven hot zone and into a cooler oven zone which is maintained at a temperature of 200° C. or lower. The product is an improved scintillation material suitable for use at temperatures up to and above 200° C.

EXAMPLE III

The new scintillator composition was tested against prior art commercial scintillators for density, content of hydrogen atoms per cc, and maximum temperature. BC 438 is obtained from Bicron Corporation, Scintoplex III from National Diagnostics, and NE 102 from Nuclear Enterprises. The results follow in Table I.

TABLE I

PHYSICAL PROPERTIES

| Designation | Host Polymer | Density | H Atoms/cc | H Atoms/gram | T Max |
|---|---|---|---|---|---|
| BC438 | PVT (cross linked) | 1.054 g/cc | $4.86 \times 10^{22}$ | $4.61 \times 10^{22}$ | 100° C. |
| Scintiplex III | Acrylic Co-polymer | 1.18 g/cc | $5.3 \times 10^{22}$ | $4.49 \times 10^{22}$ | 150° C. |
| Product of Example II | PMP Modified | 0.83 g/cc | $8.3 \times 10^{22}$ | $10.0 \times 10^{22}$ | 200° C. |
| NE 102 | PVT | 1.032 g/cc | $5.3 \times 10^{22}$ | $5.1 \times 10^{22}$ | 75° C. |

EXAMPLE IV

The scintillator composition was tested against prior art commercial compositions for neutron and gamma-ray scintillation behavior. The refractive index, $n_d$, of the material was measured with the D line of sodium. The results follow in Table II.

TABLE II

OPTICAL PROPERTIES

| | maximum emission (λ) | $n_d$ | Intensity vs NE 102 |
|---|---|---|---|
| BC 438 | 425 nm | 1.58 | 136% |
| Scintiplex III | 435 nm | 1.49 | 82% |
| Product of Example II | 400 nm | 1.46 | 30% (at 20° C.) |
| NE 102 | 423 nm | 1.58 | 100% |

The unique low density of the polymethylpentene host plastic, in combination with its high hydrogen concentration, permits the scintillator to be very insensitive to gamma or x-rays but very sensitive for neutron detection applications.

EXAMPLE V

Polymethylpentene is useful as a plastic scintillator material not only for its high temperature resistance, but also for its high neutron sensitivity. Table III shows the results of testing of various characteristics of conventional plastic host materials, such as acrylics.

TABLE III

| | Density grams/cc | Refractive Index ($n_d$) | H Atoms/cc | Melting Temperature |
|---|---|---|---|---|
| Polymethylpentene | 0.83 | 1.46 | $8.3 \times 10^{22}$ | 235° C. |
| Conventional Acrylic Plastics | 1.18 | 1.49 | $5.3 \times 10^{22}$ | 75-200° C. |

As disclosed, polymethylpentene-based plastic scintillator materials are the only plastic scintillator materials capable of withstanding unsupported operation up to 200° C. with no visible distortion. A detailed optical spectroscopic study of this material as the function of temperature also shows no deterioration in fluorescent light output when cycled consecutively through 75° C., 150° C. and 200° C. for one hour each and then returned to room temperature. In addition, ultraviolet excited fluorescence spectroscopy at temperature indicates that unlike conventional plastic scintillator systems the formulation described here actually increases in overall light output. The measured increase is a function of the exact composition but has been as large as a factor of 2 at 200° C. compared to the total light output at room temperature.

The invention has been described herein with reference to certain preferred embodiments. However, as obvious variations thereon will become apparent to those skilled in the art, the invention is not to be considered as limited thereto.

What is claimed is:

1. As an article of manufacture, a plastic scintillator which will function at high temperatures and retain its optical properties, said scintillator comprising a polymethylpentene host plastic containing an aromatic hydrocarbon fluorescent agent.

2. An article of manufacture according to claim 1, wherein the aromatic hydrocarbon is selected from the group consisting of naphthalene, naphthalene derivatives, and mixtures thereof.

3. An article of manufacture according to claim 1, wherein a secondary fluorescent agent is added to the composition.

4. An article of manufacture according to claim 3, wherein the secondary fluorescent agent is selected from the group consisting of anthracene, anthracene derivatives, oxazole, oxazole derivative, oxadiazole, styryl derivatives, stilbene derivatives and mixtures thereof.

* * * * *